Figure 1:
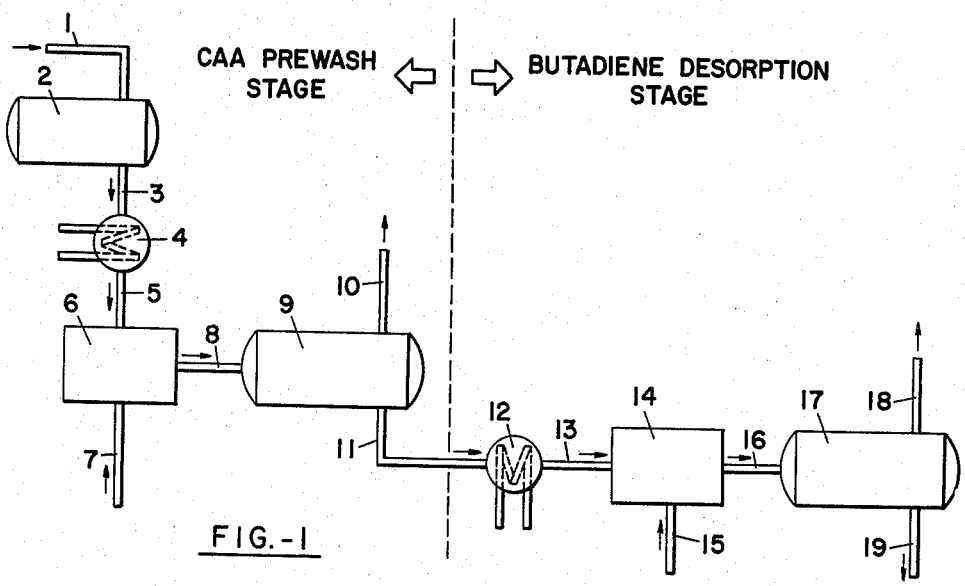

CAA PREWASH STAGE ⇐ | ⇒ BUTADIENE DESORPTION STAGE

DISTRIBUTION COEFFICIENTS FOR BUTADIENE AND ACETYLENES BETWEEN CAA SOLUTION AND HYDROCARBON (GM/1000 GM CAA)/(GM/1000 GM HC) DECREASE WITH INCREASING TEMPERATURE

Norman N. Hochgraf  Inventor

By *Seymour Stahl*  Attorney

United States Patent Office 2,963,523
Patented Dec. 6, 1960

2,963,523

ACETYLENE REMOVAL FROM HYDROCARBON STREAMS

Norman N. Hochgraf, Basking Ridge, N.J., assignor to Esso Research and Engineering Company, a corporation of Delaware Filed Nov. 13, 1958, Ser. No. 773,792

8 Claims. (Cl. 260—681.5)

This invention relates to an improvement in a prewash system for the removal of acetylenes from a 1,3-butadiene (hereafter called butadiene) bearing stream prior to extraction of the butadiene in an extraction plant and particularly in a plant which employs an aqueous cuprous ammonium acetate butadiene solvent.

Butadiene is found in various streams such as from the dehydrogenation of butanes and butenes as well as as from steam cracking processes. These and other butadiene bearing streams tend to contain substantial amounts, e.g., 500–10,000 p.p.m., of acetylenic compounds which boil in the approximate range of butadiene. In particular, vinyl, ethyl and methyl acetylenes are common contaminants in butadiene bearing $C_4$ streams obtained by hydrocarbon cracking and dehydrogenation. The aforesaid acetylenes, if not removed prior to the main extraction of the butadiene, cause serious difficulties in the extraction plant and may make the production of the desired purity butadiene impossible. Particularly, these acetylenes polymerize rapidly and tend to foul the apparatus and give rise to foaming and emulsification in the main extraction plant. In addition, acetylenes are undesirable contaminants in the processes for producing synthetic rubber from butadiene and styrene.

It has been suggested in a U.S. patent to Kestner et al., No. 2,847,487, to prewash the main butadiene bearing stream with aqueous cuprous ammonium acetate solvent (CAA) thereby removing all, or a substantial amount of, the acetylenes. In this prewash process of the above patent the solvent extract from the prewash stage contains not only acetylenes but also appreciable quantities of butadiene. The substantially acetylene-free raffinate from the prewash zone is then passed to the main extraction plant. In this prior art process, the acetylene-containing solvent extract is first desorbed of butadiene at temperatures of the order of 140° to 180° F. and the remaining extract, comprising CAA solvent and acetylenes, is passed to a stripping zone wherein acetylenes are stripped from the solvent and the solvent recycled either to the prewash stage or, if desired, mixed with the solvent for the main extraction process.

It has been recognized that maintaining hydrocarbon streams containing acetylenes and butadiene at elevated temperatures for substantial periods of time promote the polymerization of acetylenes and butadiene. For this reason it is usual to maintain short holdup times in the butadiene desorber to avoid these difficulties. In the Kestner et al. process, the relatively high desorption temperatures required result in considerable desorption of acetylenes along with the butadiene and polymerization of both butadiene and acetylenes.

It has now been found that the solvent extract from the prewash stage may be contacted with small amounts of liquid hydrocarbon having a sufficiently low butadiene concentration to desorb substantial amounts of the butadiene from the solvent extract along with only relatively minor amounts of the acetylenes. The desorbed butadiene in hydrocarbon solution is then suitable for re-extraction in the prewash stage or, if desired, in the main extraction plant. By resort to this invention, which will be described in detail subsequently with reference to the drawing, a substantial improvement in the operation of the prewash system is effected. Moreover, the butadiene recovered by use of this invention is much less contaminated with desorbed acetylenes than butadiene recovered in the vapor phase.

In general, the acetylene prewash solvent employed for this process will have the following typical analysis.

TABLE I (Prewash solvent)

| Component | Specific Example | Range (As moles/liter of solution) |
|---|---|---|
| Cupric copper | 0.4 | 0.1-0.7 |
| Cuprous copper | 2.0 | 1.5-3.5 |
| Ammonia | 10.0 | 8.0-12.0 |
| Acetate (as acetic acid) | 5.9 | 4.0-7.0 |

The concentrations of the individual components may vary outside of this range if desired. While the main butadiene extraction plant solvent is employed in ratios of approximately 5 to 15/1 of solvent to hydrocarbon, in the prewash operation the ratios are somewhat reversed. It is preferable to employ, for example, a ratio of from 1 to 10/1 of hydrocarbon to CAA solvent. The exact ratio will depend on the amount of acetylenes present in the butadiene bearing hydrocarbon streams as well as on the temperatures employed. Insofar as prewash temperatures are concerned it is preferred to employ a range of 20° to 60° F., although a range of 0° to 100° F. is operable. The prewash solvent extract will comprise principally aqueous cuprous ammonium acetate referred to herein as CAA with minor amounts of butadiene, butenes, butanes and acetylenes. Preferably over half of the acetylenes present in the hydrocarbon feed to the prewash stage will be absorbed by the prewash solvent, whereas only a few percent of the butadiene present in the $C_4$ stream will be absorbed in the solvent. In accordance with this invention the prewash CAA solvent extract from the prewash stage is contacted with from 0.1 to 1.0 volumes of a hydrocarbon stream having a low butadiene content per volume of CAA solvent. Preferably there will be employed a $C_4$ stream such as obtained as raffinate from the main butadiene extraction process. A typical raffinate from an extraction plant feeding a steam cracked $C_4$ cut will be of the following approximate composition:

| | Mol percent |
|---|---|
| $C_3$ and lighter | 0.1 |
| Butanes | 1.1 |
| Butenes | 97.0 |
| 1,3-butadiene | 1.5 |
| $C_5$ and heavier | 0.3 |

However, any paraffinic or olefinic hydrocarbon, i.e. aliphatic hydrocarbons having at least twice as many hydrogen atoms as carbon atoms per molecule, would be a satisfactory desorbent medium as long as its solubility in CAA is very limited. Butanes and/or butenes are highly preferred because the butadiene is easily recovered by recycle to the prewash feed or direct extraction in the main plant.

The prewash solvent is intimately contacted with the hydrocarbon stream and after a suitable period the mixture is allowed to separate into two liquid phases; the upper phase contains essentially all of the desorbent hydrocarbon and also butadienes extracted from the CAA solvent along with very minor amounts of acetylenes. The temperature for this desorption process may range from 0° to 130° F., but is preferably maintained below 100° F. By maintaining the temperatures below 100° F., polymerization and copolymerization of acetylene with butadiene is minimized. In this liquid-liquid extraction or desorption step substantially all of the butadienes and preferably less than 10–25% of the acetylenes entering the desorption step will be contained in the resulting hydrocarbon phase. The respective amounts of butadiene and acetylene which are desorbed are dependent primarily on temperature and hydrocarbon/CAA treat ratio, although CAA composition is a factor. At the lower temperatures, e.g., 0° to 75° F., smaller amounts of the butadiene and acetylene are desorbed and conversely at the higher temperatures, e.g., 75° to 130° F., larger amounts of butadiene and acetylenes are desorbed into the hydrocarbon phase. However, as will be shown later, the selectivity of the process for butadiene desorption declines only slightly. By this technique maximum recovery of the butadiene normally lost in the prewash operation is obtained.

In a preferred embodiment, this invention contemplates the use of a butane and/or butene containing stream having a low butadiene concentration as the desorption medium. The raffinate from a CAA butadiene extraction plant will be such a stream. By low butadiene concentration it is meant less than about 5–10% by weight.

In another embodiment of this invention, the hydrocarbon phase from the desorption stage is recycled to the CAA prewash stage where additional acetylenes are extracted and the desorbed butadiene is reintroduced into the main butadiene bearing stream. The lower, or CAA, phase from the desorption stage which comprises the rich CAA prewash solvent is then passed to an acetylenes stripper wherein the CAA is regenerated and recycled for further use; however, this invention is not concerned with the regeneration of the CAA prewash solvent.

Figure 2:
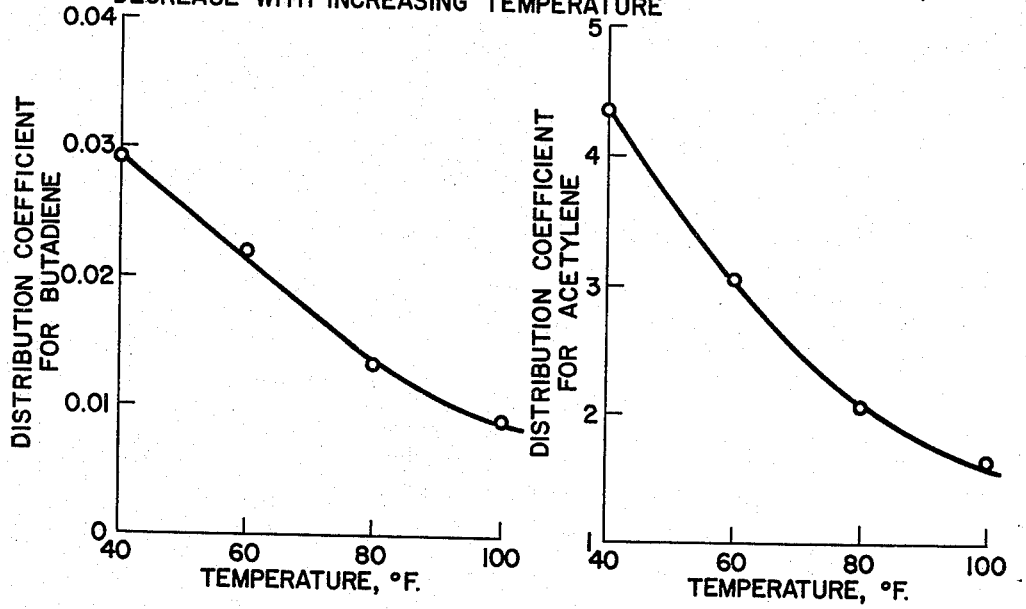

For a more complete understanding of the present invention, reference may be had to the drawings. Figure 1 discloses a schematic flow plan of a prewash process in accordance with this invention. The acetylene stripping stage is omitted for convenience since this is conventional in prior art processes. Figure 2 shows the distribution coefficient curves for butadiene and acetylenes in a butene stream.

The acetylenes-contaminated butadiene bearing stream is passed through line 1 to surge drum 2 and thence, via line 3, to chiller 4 where the hydrocarbon temperature is lowered preferably to between 20–60° F. Any suitable refrigerant, such as liquid ammonia, is supplied to chiller 4 to accomplish the necessary cooling. The cold hydrocarbon mixture is passed through line 5 to mixer 6 where it is intimately contacted with a cold, lean CAA solvent stream of the same temperature.

The butadiene bearing hydrocarbon stream should preferably be mixed with a minor proportion of the lean solvent as noted previously. Preferably a ratio of 2–6 parts of butadiene bearing stream per part of solvent is employed. After thorough mixing in mixer 6, the mixed solvent and hydrocarbon stream is passed via line 8 to settler drum 9 wherein the hydrocarbon phase is separated from the aqueous cuprous ammonium acetate solution. The aqueous cuprous ammonium acetate solution now contains a substantial amount of the acetylenes originally present in the untreated butadiene bearing stream. The CAA phase also contains some absorbed butadiene and only traces of butenes. Mixing and settling times preferably will be about 10 minutes to an hour for each phase. The liquid hydrocarbon, substantially free of acetylenes, is removed overhead from settler 9 via line 10 and is passed to a main butadiene extraction plant not described herein.

The cold, aqueous CAA solution, containing the absorbed acetylenes and small amounts of butadiene, is withdrawn as a bottom phase from settler 9 and passed, via line 11, to heat exchanger 12. In heat exchanger 12, the CAA solution temperature is adjusted to the desired butadiene desorption temperature, preferably 40–100° F. The CAA solution from exchanger 12 is passed via line 13 to mixer 14 where it is intimately admixed with a hydrocarbon stream of essentially the same temperature entering through line 15. As stated earlier, although hydrocarbon to CAA solution volume ratios of 0.1 to 1.0 are operable, ratios of 0.2 to 0.6 are preferred. The mixture is then passed via line 16 to desorption settler 17 wherein the phases are allowed to separate. By controlling the temperature in the desorption stage and the amount of hydrocarbon admitted to mixer 14, the amount of butadiene desorbed from the CAA solution can be controlled with relative accuracy. The upper hydrocarbon phase is then taken from the desorber settler 17 via line 18 and the said CAA solution having a substantially reduced butadiene content and a slightly reduced acetylene content is recovered via line 19 to be passed to an acetylene stripper. The butadiene containing hydrocarbon recovered via line 18 may then be recycled to line 1 for return to the prewash operation or, if desired, and if the acetylenes are in sufficiently low concentration, they may be passed to the main extraction plant with the butadiene bearing stream from line 10.

To demonstrate the effectiveness of selectively desorbing butadiene from a CAA prewash extract by liquid phase hydrocarbon extraction, reference may be had to Figure 2 of the drawings which shows the distribution coefficients for butadiene and acetylenes between CAA solution and a $C_4$ hydrocarbon stream over a range of 40° to 100° F. To obtain these data, a $C_4$ fraction containing butene, butadiene and $C_4$ acetylenes were contacted with a lean CAA solution at the temperatures specified. The distribution coefficient was calculated as the ratio of the weight in grams of butadiene and acetylene, respectively per 1,000 grams of the CAA solution phase to the weight in grams of butadiene and acetylene, respectively per 1,000 grams of hydrocarbon phase. From the curves, it will be noted that the distribution coefficient of the acetylenes is more than 150 times greater than that of the butadiene and accordingly it is possible to desorb substantially all of the butadiene from the CAA extract without substantial desorption of the acetylenes.

At the lower temperatures, desorption of hydrocarbons from the CAA phase is less effective. At the higher temperatures, hydrocarbon desorption is more complete, however, the risk of acetylene and butadiene polymerization increases. It will be noted from the data that the distribution coefficients of butadiene and acetylene between the CAA solution and hydrocarbon stream decrease at approximately the same rate over the 40° to 100° F. range. Thus, the desorption selectivity remains roughly constant while desorption effectiveness increases with temperature. Because of these characteristics, relatively large quantities of hydrocarbon desorbent medium are required for complete desorption at very low temperatures, while at too high temperatures, solution fouling because of polymerization becomes a problem. Thus, while there is a relatively wide range of temperatures over which the process can be operated, operation over a smaller range is preferred.

For a still more complete understanding of this invention, reference may now be made to the following specific example. The example utilizes one of the many possible combinations of conditions within the preferred ranges mentioned above.

*Example 1*

One hundred pounds of a $C_4$ stream comprising 65.00 pounds of butene, 34.80 pounds of butadiene and 0.20 pounds of acetylenes are mixed with 33.30 pounds of the lean CAA solution as shown in the specific example of the table. The CAA and acetylene containing hydrocarbon feed stream are mixed at 40° F. for 5 minutes and allowed to settle in a settling drum for 30 minutes. The hydrocarbon phase recovered overhead contains 65.00 pounds of butenes, 34.46 pounds of butadiene and a greatly reduced quantity of acetylenes, i.e., 0.08 pounds. The rich CAA solution from this prewash stage comprises the initial 33.30 pounds of CAA with 0.12 pounds of acetylene and 0.34 pounds of butadiene. This rich CAA extract from the prewash stage is heated to 100° F. and contacted with a $C_4$ stream containing 6.75 pounds of butene and 0.10 pounds of butadiene at 100° F. The lower CAA phase comprises the initial 33.30 pounds of CAA solution together with only trace amounts of butadiene, i.e., 0.015 pounds, and a great majority, i.e., 0.105, of the acetylenes which entered the desorption stage. The CAA solution from the desorption stage is suitable for further processing such as acetylene stripping and regeneration to lean CAA which is then suitable for recycle to the prewash stage. The hydrocarbon phase taken from the butadiene desorption stage settler comprises 6.75 pounds of butene, a substantial amount of the butadienes, i.e., 0.425 pounds, and only very minor amounts of acetylenes, i.e., 0.015. The hydrocarbon phase from the butadiene desorption stage is then suitable for recycle to the prewash stage or, if desired, to the main extraction plant provided the acetylene is sufficiently low. In this embodiment 87.5% of the acetylenes extracted in the prewash stage are retained in the CAA solution from the butadiene desorption stage, whereas 96.5% of the butadiene extracted in the prewash stage is desorbed into the hydrocarbon phase in the desorption stage and recovered.

Table II sets forth the composition of the various streams at different key points.

TABLE II

[All quantities in pounds]

| Stream No. | 1 | 7 | 10 | 15 | 18 | 19 |
|---|---|---|---|---|---|---|
| CAA | | 33.30 | | | | 33.30 |
| Butenes | 65.00 | | 64.90 | 6.75 | 6.85 | |
| Butadiene | 34.80 | | 34.46 | 0.10 | 0.425 | 0.015 |
| Acetylenes | 0.20 | | 0.08 | | 0.015 | 0.105 |

What is claimed is:

1. In a process for prewashing, prior to extraction of butadiene in a main extraction step, a butadiene bearing stream which also contains acetylenes, in which process said butadiene bearing stream is contacted in a prewash stage in major proportion with a minor proportion of an aqueous cuprous ammonium acetate solvent to absorb a substantial portion of said acetylenes and a minor portion of said butadiene to obtain a rich prewash solvent and a butadiene bearing stream of reduced acetylenes content, and in which process said butadiene bearing stream of reduced acetylenes content is passed to said main butadiene extraction step and said rich prewash solvent is desorbed of butadiene in a butadiene desorption step, the improvement which comprises contacting said rich prewash solvent in said butadiene desorption step in liquid phase with a liquid stream consisting essentially of $C_4$ aliphatic hydrocarbons containing at least twice as many hydrogen atoms as carbon atoms per molecule and less than 10 weight percent butadiene in a ratio of 0.1 to 1.0 volumes of said $C_4$ hydrocarbon stream per volume of rich prewash solvent at temperatures of 0° to 100° F., extracting in liquid phase at least a major portion of the butadiene from said rich prewash solvent into said $C_4$ hydrocarbon stream and recovering the butadiene containing $C_4$ hydrocarbon stream.

2. In a process for reducing the acetylenes content of a butadiene bearing hydrocarbon fraction which also contains acetylenes, in which process (1) said butadiene bearing fraction is contacted in a prewash stage with an aqueous cuprous ammonium acetate solvent to absorb from said butadiene bearing fraction a substantial portion of said acetylenes and only a minor portion of said butadiene (2) a butadiene bearing fraction of reduced acetylenes content is obtained from said prewash stage for passage to a main extraction zone wherein butadiene is recovered and (3) an acetylene rich prewash solvent containing some butadiene is obtained from said prewash stage and treated to recover additional butadiene therefrom, the improvement which comprises contacting said acetylene rich prewash solvent in liquid phase with a liquid desorbent stream containing aliphatic hydrocarbons having at least twice as many hydrogen atoms as carbon atoms per molecule, which desorbent stream has a low butadiene concentration and low solubility in said solvent, thereby desorbing from said acetylene rich prewash solvent into said desorbent stream a substantial amount of butadiene together with minor amounts of acetylenes, and separating the resultant butadiene containing liquid hydrocarbon stream from said acetylene rich cuprous ammonium acetate prewash solvent.

3. A process according to claim 2 wherein said desorbent stream is mixed with said acetylene rich prewash solvent at temperatures between 0° and 130° F.

4. A process in accordance with claim 1 wherein the butadiene containing $C_4$ hydrocarbon stream is recycled to the prewash stage.

5. A process in accordance with claim 1 wherein butadiene is separated from said butadiene containing $C_4$ hydrocarbon stream.

6. A process for removing acetylenes from a butadiene bearing stream which comprises contacting said butadiene bearing stream with a lean cuprous ammonium acetate solution in a prewash stage to extract into said cuprous ammonium acetate solution a major portion of the acetylenes originally present in said butadiene bearing stream and a minor proportion of the butadiene originally present in said butadiene bearing stream, separating from said prewash stage a rich cuprous ammonium acetate solvent containing minor amounts of butadiene and acetylenes, contacting said rich cuprous ammonium acetate solvent with a desorbent comprising butene and having less than 10 wt. percent butadiene concentration at temperatures from about 40° to 100° F. to extract into said desorbent a major portion of the butadiene from said rich cuprous ammonium acetate solvent and a minor portion of acetylenes contained therein, separating the butene desorbent containing butadiene with very minor amounts of acetylenes from the rich cuprous ammonium acetate solvent containing a reduced amount of butadiene.

7. A process in accordance with claim 6 wherein said separated butadiene containing desorbent stream is recycled to the prewash stage.

8. A process in accordance with claim 6 wherein the butadiene contained in said desorbent is separated therefrom and said desorbent is recycled for contact with the rich cuprous ammonium acetate solvent from the prewash stage.

References Cited in the file of this patent

UNITED STATES PATENTS

| 2,453,853 | Morrell et al. | Nov. 16, 1948 |
| 2,847,487 | Kestner et al. | Aug. 12, 1958 |